UNITED STATES PATENT OFFICE.

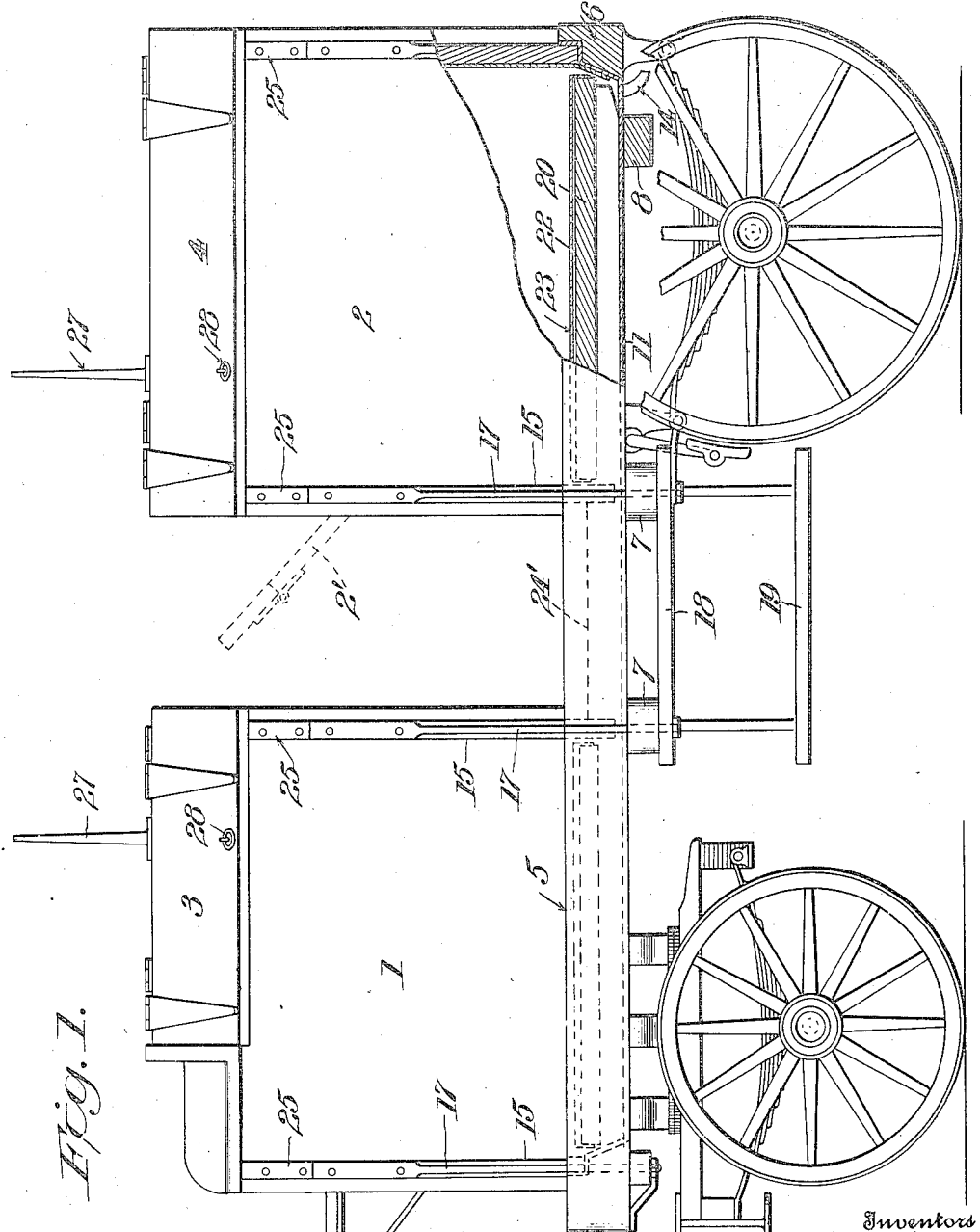

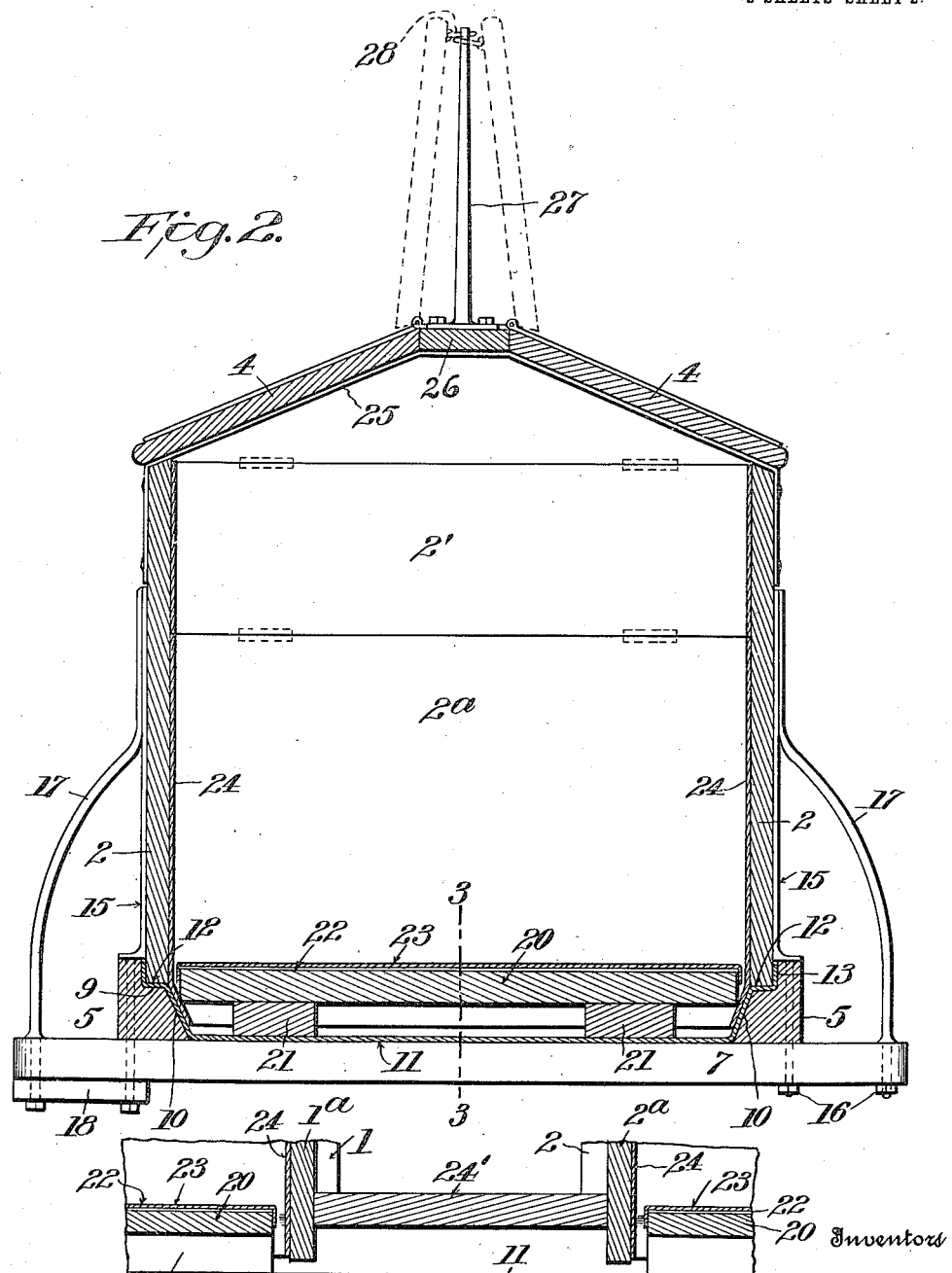

JOHN C. RAUM AND JOHN J. RAUM, OF BALTIMORE, MARYLAND.

VEHICLE.

985,633.

Specification of Letters Patent.   Patented Feb. 28, 1911.

Application filed November 16, 1910.   Serial No. 592,626.

*To all whom it may concern:*

Be it known that we, JOHN C. RAUM and JOHN J. RAUM, citizens of the United States, residing at Baltimore, State of Maryland, have invented certain new and useful Improvements in Vehicles, of which the following is a specification.

Our invention relates to vehicles and more particularly to that class of vehicles used for the transportation of material from which waste liquid is likely to flow during transportation.

The object of the present invention is to provide practical and efficient means for preventing such waste liquid from coming in contact with the frame or running gear of the vehicle in order to obviate deleterious effects which would otherwise be produced by such liquid.

To this end our invention seeks to provide a water tight receptacle or pan underneath the floor of the body proper, such pan being arranged to collect the drippings from the material in the body and to convey them to a point where they may be conveniently discharged.

Further, the invention contemplates the provision of a pan which is so constructed as to overlie the frame of the wagon and protect it from the liquid, such pan and the overlying floor being readily removable for the purpose of cleaning or repairing.

As a practical embodiment of our invention, we have illustrated it in the accompanying drawings as applied to that type of vehicle commonly known as an ice cream wagon, from which there is a constant leakage of salt water.

In the drawings, Figure 1 is a side elevation of an ice cream wagon constructed in accordance with our invention; Fig. 2 is a transverse section thereof; and Fig. 3 is a fragmentary longitudinal section through the middle part of the wagon substantially along the line 3—3 of Fig. 2.

Referring to the drawings in detail, the wagon consists of the usual two compartments 1 and 2 separated by a space or passageway. One of these compartments is used for containing crushed ice, while the other is employed to contain the tubs of ice cream packed in a freezing mixture of ice and salt. The compartments 1 and 2 are provided with hinged covers 3 and 4, respectively, and also preferably with a hinged end gate such as 2' in Fig. 2.

The compartments 1 and 2, forming the body of the wagon, are supported, as hereinafter described, upon a rectangular frame consisting of side members 5 extending the full length of the wagon and end members 6. Beneath the side members 5 extend the cross beams 7 and end sill 8.

It will be seen that the members 5, (and also 6), are cut so as to provide on the inside thereof, a horizontal shoulder 9 below which extends an inwardly inclined or beveled face 10.

The removable pan is designated in its entirety, by the reference character 11. As clearly shown in the drawings, this pan extends the full length of the frame 5 and 6 and is provided, along its edges, with a horizontally extending portion 12 and a vertically extending flange 13 which fit into the grooves formed in the sills 5 and 6 adjacent the shoulder 9. Drip spouts 14 extend downwardly from the pan 11 at any desired points, such spouts being disposed so as to carry the drippings clear of the running gear.

The body compartments 1 and 2 are secured to the frame members 5 by means of specially constructed strap bolts 15, which preferably extend practically the full height of the body compartments and are provided with shanks extending through the members 5 and cross sills 7 and provided underneath with nuts 16. Outside of the strap bolts 15 are arranged on each side of the wagon a pair of braces 17 which extend through the outer ends of the sills 7. Underneath these sills may be supported the usual steps 18, 19, the braces 17 serving as handles in mounting the steps. It will be observed that the steps are opposite the passageway between the body compartments.

By reference to Fig. 2 it will be observed that the lower edge of the sides of the body compartments such as 2 are supported by the horizontal shoulder 9, the horizontally extending portion 12 of the pan lying between such shoulder and the body and the flange 13 lying between the body and the upper portion of the sills 5, adjacent the shoulder. In other words the edge of the pan is clamped between the body and the sills and is thus held securely in place. Furthermore the bottom of the pan is supported by the cross sills 7 and 8 on which it rests.

Each compartment is provided with a removable floor for supporting the material being transported. This floor preferably consists of boards 20 secured to sleepers 21 which rest upon the bottom of the pan and are supported by the cross beams. This bottom is preferably covered with sheet metal 23, such as copper, zinc or galvanized iron, a layer of paper 22 or similar material being preferably interposed between the boards and the metal. The entire compartment is likewise lined on its sides and ends with similar sheet metal 24, the lower edges of which extend down below the bottom of the body 2 and project well within the pan below the horizontal portion 12 thereof.

Between the compartments 1 and 2 the floor of the passage way is constituted by a running board 24' the ends of which rest upon the shoulder 9 of the side members 5, while, as clearly shown in Fig. 3, the ends of the sides of the compartments 1 and 2 project beyond and overlie this running board so as to hold it in position. It will also be noted that such running board is confined laterally between the end walls 1ᵃ and 2ᵃ of the compartments 1 and 2 respectively, which project down below the running board almost to the bottom of the pan 11. The waste liquid runs freely off the bottom of the compartments and escapes between the edge of such bottoms and the side and end walls as clearly shown in the drawings, the sleepers 21 being the only wood work exposed to the action of the liquid.

A strap iron 25 extends in truss form from one side to the other of each compartment at each end thereof and forms the support for the longitudinally extending beam 26 to which the doors 3 and 4 are hinged. Also supported on the beam 26 is an upstanding post 27 of a length slightly less than the width of the doors. To the top of each door near its outer edge is pivoted a ring, such as 28, adapted to engage the top of the post, as clearly shown in dotted lines in Fig. 2, in order to hold the doors in position.

It will be observed that the floorings of the compartments may be readily removed at any time for the purpose of cleaning or repairing the pan, and, if desired, the pan itself may be removed from the frame by unscrewing the nuts 16 and lifting off the body compartments.

It will thus be seen that we have provided a practical and efficient anti-drip arrangement which is well adapted to a large variety of uses, the invention being applicable either to motor propelled or horse vehicles of any kind as well as to railway cars, and it is thought that the many advantages of our invention will be readily appreciated by those familiar with such matters.

What we claim is:—

1. In a vehicle, a rectangular frame, a pan fitting within and supported by said frame, and a body resting above said pan and also within said frame, the sides of said body being provided with a sheet metal lining, the lower edge of which extends within and below the upper edge of said pan, substantially as and for the purpose described.

2. In a vehicle, a rectangular frame, the inner face of which is beveled, a pan fitting within and supported by said frame, said pan having beveled sides and ends to conform with the shape of said frame and a horizontally extending portion resting upon the same, a body supported by said frame upon the horizontal portion of the sides of said pan, and a floor in said body above the bottom of the pan, the edges of said floor being spaced from the sides of said body and lying above the beveled sides of the pan, whereby liquid may readily flow off said floor into said pan.

3. In a vehicle, a rectangular frame having a horizontally extending shoulder running around the inside thereof, a sheet metal pan fitting within and supported by said frame, the metal edges of the pan overlying the said shoulder, and a body fitting within said frame and having its lower edge supported by the said shoulder in such a manner that the sheet metal lies between the body and shoulder.

4. In a vehicle, a rectangular frame having a horizontally extending shoulder running around the inside thereof, a sheet metal pan fitting within and supported by said frame, the metal at the edges of the pan overlying the said shoulder, a body fitting within said frame and having its lower edge supported by the said shoulder in such a manner that the sheet metal lies between the body and shoulder, the sides of said body being provided with a sheet metal lining the lower edge of which projects below said shoulder and overhangs the pan.

5. In a vehicle, the combination with a frame comprising side and cross sills, of a pan supported by said frame, a body supported above said pan and having a removable bottom, said bottom resting upon the bottom of said pan above said cross-sills, and supported wholly thereby.

6. In a vehicle, the combination with a frame comprising side sills, front and rear compartments carried by said frame and spaced apart to provide a passage way, and a floor for said passageway supported wholly by said side sills, said floor being confined between the adjacent end walls of said compartments said end walls projecting below said floor and upper edge of the side sills, the ends of the side walls of said compartments overhanging said floor so as to hold it in position.

In testimony whereof we affix our signatures in presence of two witnesses.

JOHN C. RAUM.
JOHN J. RAUM.

Witnesses:
JOHN W. LOHMULLER,
BESSIE C. LOHMULLER.